United States Patent Office 2,802,725
Patented Aug. 13, 1957

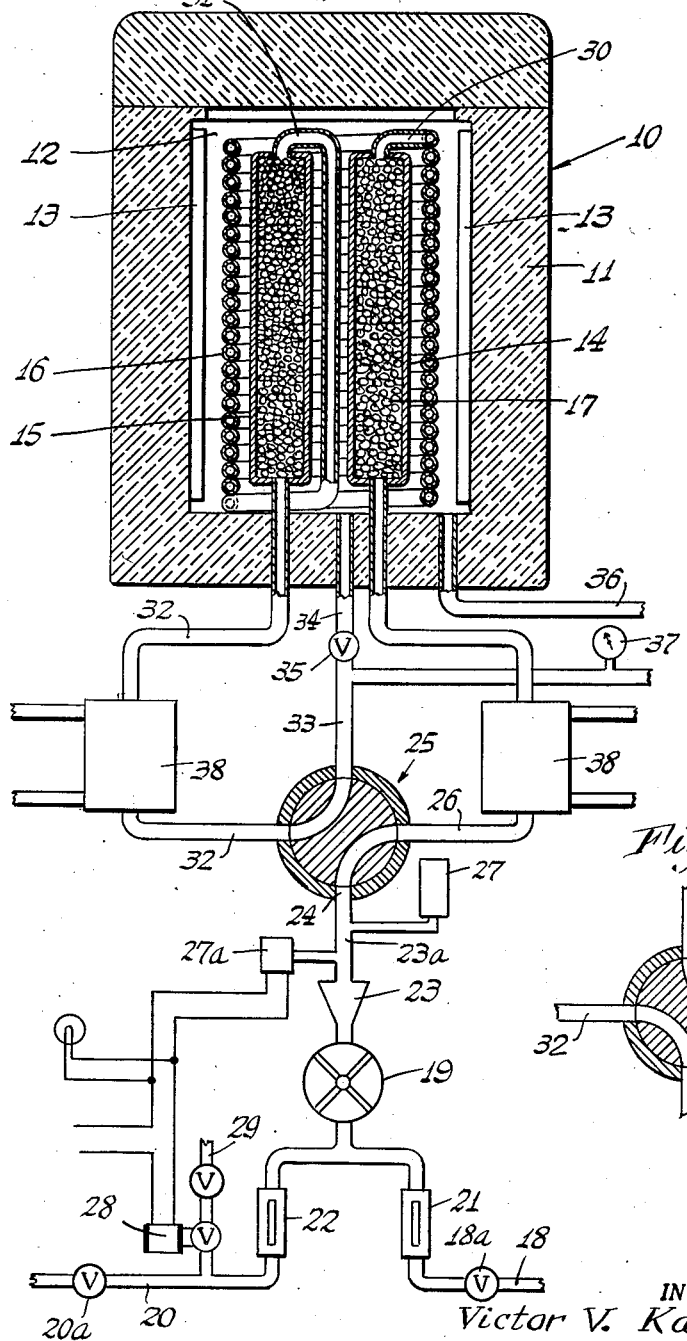

2,802,725

ENDOTHERMIC GAS GENERATOR

Victor V. Kappel, Trumbull, Conn.

Application May 11, 1955, Serial No. 507,651

8 Claims. (Cl. 23—281)

The present invention relates to an endothermic gas generator system for producing special gaseous atmospheres such as are used for enveloping metal undergoing a heat treating process and, more particularly, to a novel gas reacting means in which the gases are accurately controlled during the formation of the special gaseous atmospheres so as to provide a close control therefor.

It is an object of the present invention to provide a simplified endothermic gas generator which is of simple construction and which has a long life.

Another object is to provide an efficient endothermic gas generator which insures complete decomposition of the gases.

A further object of the invention is to provide a generator which may be easily and quickly reversed to permit burning out of carbon deposits which may be formed therein.

A still further object of the invention is to provide a protective atmosphere within the heating chamber to protect the elements contained therein and extend the life thereof.

In carrying out these objects a novel endothermic gas generation system is provided in which a gas from a suitable supply passes into a first catalytic chamber and is in contact with a catalyst therein. The gases generated therein are then fed through a gas detention tube within the heating chamber and of substantial length which extends from one end to the other of the heating chamber to resist reversion of the gases. The gas from the detention tube is then fed into the upper end of a second catalytic chamber and the completely decomposed gas is fed from the lower end of the chamber to a device to be utilized therein.

A feature of the invention resides in tapping from the line leading to the prepared atmosphere a branch line controlled by a suitable valve leading to the interior of the heating chamber so that the elements within the heating chamber are subjected to the prepared atmospheres and protected during the use thereof.

Another feature of the invention resides in the connecting of the supply and receiver to the gas generator through a four-way valve which will permit automatic reversal of the direction of flow of gases through the generator to prevent undue accumulation of carbon in the catalytic chambers.

A further feature of the invention resides in the efficiency and simplicity of the construction whereby effective decomposition of the gases is achieved.

Other features and advantages of the invention will be apparent from the specification and claims when considered in connection with the drawings in which:

Figure 1 shows a diagrammatic view of the endothermic gas generator of the present invention.

Fig. 2 shows a fragmentary view of the four-way valve in its reverse position.

The endothermic gas generator illustrated in the drawings is adapted to produce a special gaseous atmosphere such as is used in heat treating processes for enveloping metal undergoing treatment. Generally, such special gaseous atmospheres are produced by means of breaking down a mixture of air and a gaseous fuel, preferably the hydrocarbon type, such as natural gas, manufactured gas, propane, butane or methane, into hydrogen, nitrogen, carbon monoxide, carbon dioxide, and methane. Under some circumstances it may be desired to produce other gaseous atmospheres such as by the dissociation of ammonia.

In producing these special gaseous atmospheres, the present invention provides a novel endothermic generator which comprises a housing 10 usually made of a metal encased, heat insulating and resistant refractory wall structure 11 forming on the interior a heating chamber 12. While gas or other means may be utilized to heat the heating chamber, in the illustrated form of the invention the heat therefor is provided by suitable electric heaters, indicated diagrammatically at 13 and mounted on the walls of the chamber which maintain the heating chamber between 1700° F. to 2000° F., and preferably at about 1850° F. depending upon the volume of gas passing therethrough.

Disposed within the heating chamber are catalytic chambers and a gas detention coil through which the gas passes as it is broken down into its component parts. Preferably, the coil and/or chambers are made of stainless steel or "Inconel," a high nickel, low chrome alloy.

While the number of chambers and the location of the chambers and coil may vary, in the illustrated form of the invention there are employed two catalytic chambers 14, 15 which are connected by a long detention coil 16, with the pair of chambers disposed in parallel relation and the detention coil located therearound in the space between the heaters and the catalytic chambers as shown in the drawings and maintained at a high heat to prevent the reversion of the gases passing therethrough.

A suitable catalyst 17 which may be ceramic balls coated with a nickel salt, iron oxide or iron fill the catalytic chambers.

The mixture of air and fuel gas is fed from a source into one end of the catalytic chamber 14. The gas supply can be provided by an suitable means. As illustrated in Fig. 1, a line 18 from a supply of fuel gas is led to a mixing pump 19 as is a line 20 from an air supply. Suitable flow meters 21, 22 installed in the lines show the volume of gases passing to the mixing pump and the mixture can be accurately controlled by the valves 18a, 20a. From the mixing pump the mixed supply passes through a fire check 23 into a line 23a leading to the in-put port 24 in the four-way valve 25, through the valve to a line 26 which has its other end connected to one end of the catalytic chamber 14. A pressure indicator 27 and pressure switch 27a are connected in the line 23a. The switch 27a through a solenoid-operated valve 28 provides additional air from line 29 when such is required due to a build-up of pressure through carbon accumulation in the catalytic chamber as will be explained. The mixture passes through the chamber in contact with the catalyst and is broken down with the gas leaving the other end of the chamber passing through line 30 to one end of the detention coil 16. The gas passes through the detention coil at which time it is subjected to high heat which prevents reversion of the gases back to their original form. From Fig. 1 it will be noted that the lower end of the detention coil is connected by a line 31 to the upper end of the second catalytic chamber 15, i. e., that end adjacent from which the gas passes from the first catalytic chamber 14. The gas from the detention coil passes through the second catalytic chamber 15 and into line 32 extending from the bottom end of the catalytic chamber to a port in the four-way valve and through the valve to the output line 33 leading to the device (not shown) requiring the special gaseous atmosphere. Line 33 has a tap line 34 controlled by valve 35 extending therefrom to the heating chamber whereby a portion of the special gas is led to the interior of the heating chamber so as to provide a protective atmosphere in the heating chamber. A vent 36 for the heating chamber is provided whereby these gases after functioning in the heating chamber can be exhausted.

Further, the line 33 may be provided with a dew point indicator 37 so that the carbon potential of the special gaseous atmosphere, which varies inversely as the dew point, can be readily determined in such cases where the special gas is used to match the carbon or to control the carbon content in carbon steel being treated.

It will be apparent that as the mixed gases pass into the first catalytic chamber there will be a tendency for the gas to produce a deposit of carbon in solid form in the entrance end of the chamber due to the cooler gases contacting the hot catalyst and the walls of the chamber and this will gradually accumulate, reducing the flow of gases. This can be compensated to a degree by means of the pressure switch 27a and solenoid valve 28 feeding in additional air to burn off this carbon. However, the present invention provides a novel arrangement whereby the flow of the gas through the generator can be reversed. Thus, after a period of time when the deposit has become objectionable in the catalytic chamber 14, the four-way valve is reversed, as shown in Fig. 2, so that the gas from the supply line 23a passes into the line 32, into the bottom of catalytic chamber 15 and through the coil and chamber 14 and out through line 26 to line 33. With this arrangement it will be seen that the cool gases entering will engage the catalyst in the bottom of the chamber 15 and that the gases with the highest temperature will engage the deposits in the bottom of the chamber 14 and burn off the same. Thus, by a simple operation of a reversing valve, a substantial improvement of the operation of the gas generator is obtained.

If desired, water coolers or other cooling devices 38 can be provided on lines 26 and 32 so as to cool the gas, leaving the generator to a suitable temperature for use in the heat treating or other device, not shown.

Variations and modifications may be made within the scope of the claims and portions of the improvements may be used without others.

I claim:

1. An endothermic gas generator for producing a special gaseous atmosphere comprising a heating chamber, means for supplying a gas mixture under pressure to one end of a catalytic chamber disposed in said heating chamber, an elongate coil having one end connected to said catalytic chamber to receive the generated gases therefrom and to detain said gases therein at high temperature to prevent a reversion thereof, a second catalytic chamber disposed within the heating chamber and connected to the other end of said coil to receive the generated gases therefrom and complete the decomposition thereof into a special gaseous atmosphere, said elongate coil and said connections to said catalytic chambers being entirely within the heating chamber, and means connected to the other end of the second catalytic chamber to receive said produced special gaseous atmosphere.

2. An endothermic gas generator for producing a special gaseous atmosphere for use in heat treating of metals comprising a heating chamber, means for supplying a gas mixture under pressure to one end of a catalytic chamber disposed in said heating chamber, an elongate coil having one end connected to said catalytic chamber to receive the generated gases therefrom and to detain said gases therein at high temperature to prevent a reversion thereof, a second catalytic chamber disposed within the heating chamber and connected to the other end of said coil to receive the generated gases therefrom and complete the decomposition thereof into a special gaseous atmosphere, said elongate coil and said connections to said catalytic chambers being entirely within the heating chamber, conduit means connected to the other end of the second catalytic chamber and adapted to conduct said produced special gaseous atmosphere to a heat treating means, and means connected to said conduit means and the heating chamber to divert a portion of said special gaseous atmosphere into the heating chamber to protect the elements disposed therein.

3. An endothermic gas generator for producing a special gaseous atmosphere for use in heat treating of metals comprising a heating chamber, gas generating means for generating said special gaseous atmosphere comprising a plurality of catalytic chambers and an elongate coil connecting at least a pair of said chambers intermediate the ends of said generating means, said generating means being disposed entirely within the heating chamber and said elongate coil maintaining the gases at a high temperature to prevent reversion thereof as the gases pass between the connected catalytic chambers, a first line connected to one end of the gas generating means, a second line connected to the other end of the gas generating means, and a four-way reversing valve means adapted to connect said first and second lines to a supply of a gas mixture and a heat-treating means whereby the flow of gas through said gas generating means including said coil may be readily reversed.

4. An endothermic gas generator for producing a special gaseous atmosphere for use in heat treating of metals comprising a heating chamber, gas generating means for generating said special gaseous atmosphere comprising a plurality of catalytic chambers and an elongate coil connecting at least a pair of said chambers intermediate the ends of said generating means, said generating means being disposed entirely within the heating chamber and said elongate coil maintaining the gases at a high temperature to prevent reversion thereof as the gases pass between the connected catalytic chambers, a first line connected to one end of the gas generating means, a second line connected to the other end of the gas generating means, a four-way reversing valve means adapted to connect said first and second lines to a supply of a gas mixture and a heat treating means whereby the flow of gas through said gas generating means including said coil may be readily reversed, and means for conducting a portion of said generated special gaseous atmosphere into said heating chamber to protect the elements therein.

5. An endothermic gas generator for producing a special gaseous atmosphere for use in heat treating of metals comprising a heating chamber, a first line connected to one end of a catalytic chamber disposed in said heating chamber, an elongate coil disposed in said heating chamber and having one end connected to said catalytic chamber to receive cracked gases therefrom and to detain said gases therein at high temperature to prevent a reversion thereof, a second catalytic chamber disposed within the heating chamber and connected to the other end of said coil to receive the gases therefrom and complete the cracking thereof, a second line connected to the other end of the second catalytic chamber to receive said produced special gaseous atmosphere, and a four-way reversing valve means adapted to connect said first and second lines to a supply of a gas mixture and a heat-treating means whereby the flow of gas through said first and second catalytic chambers and coil may be readily reversed.

6. An endothermic gas generator for producing a special gaseous atmosphere comprising a heating chamber, a pair of catalytic chambers disposed in the heating chamber, means for supplying a mixture of oxidizing gas and fuel gas under pressure to one end of one of said catalytic chambers, an elongate coil having one end connected to said first catalytic chamber to receive the generated gases therefrom and to detain said gases therein at high temperature to prevent a reversion thereof, and having the other end connected to the second catalytic chamber to cause the gas to pass therethrough and complete the decomposition thereof into a special gaseous atmosphere, said elongate coil and said connections to said catalytic chambers being entirely within the heating chamber, and means connected to the other end of the second catalytic chamber to receive said produced special gaseous atmosphere.

7. An endothermic gas generator for producing a special gaseous atmosphere comprising a heating chamber, a pair of catalytic chambers disposed in side-by-side relation in the heating chamber, means for supplying a mixture of oxidizing gas and fuel gas under pressure to one end of one of said catalytic chambers, an elongate coil having one end connected to said first catalytic chamber to receive the generated gases therefrom and to detain said gases therein at high temperature to prevent a reversion thereof, and having the other end connected to the adjacent end of the catalytic chamber to cause the gas to pass therethrough and complete the decomposition thereof into a special gaseous atmosphere, said elongate coil and said connections to said catalytic chambers being entirely within the heating chamber, and means connected to the other end of the second catalytic chamber to receive said produced special gaseous atmosphere.

8. An endothermic gas generator for producing a special gaseous atmosphere comprising a heating chamber having heating means on the side walls thereof, a pair of catalytic chambers disposed in side-by-side relation in the heating chamber, means for supplying a mixture of oxidizing gas and fuel gas under pressure to one end of one of said catalytic chambers, an elongate coil extending around said pair of catalytic chambers and disposed in said heating chamber between the heating means and the catalytic chambers, said coil having one end connected to said first catalytic chamber to receive the generated gases therefrom and to detain said gases therein at high temperature to prevent a reversion thereof, and having the other end connected to one end of the second catalytic chamber to cause the gas to pass therethrough and complete the decomposition thereof into a special gaseous atmosphere, and means connected to the other end of the second catalytic chamber to receive said produced special gaseous atmosphere.

References Cited in the file of this patent

UNITED STATES PATENTS

| | | |
|---|---|---|
| 2,270,913 | Venema | Jan. 27, 1942 |
| 2,304,203 | Pyzel et al. | Dec. 8, 1942 |
| 2,776,192 | Painter et al. | Jan. 1, 1957 |